3,252,758

GAMMA-FERRIC-OXIDE CRYSTALS AND PROCESSES FOR THEIR PRODUCTION

Wilhelm Hoch, Krefeld-Bockum, Wilhelm Abeck, Cologne-Stammheim, and Franz Hund, Krefeld-Uerdingen, Germany, assignors to Farbenfabriken Bayer Aktiengesellschaft, Leverkusen, Germany, a German corporation No Drawing. Filed July 29, 1964, Ser. No. 386,052
Claims priority, application Germany, Dec. 15, 1960, F 32,764
4 Claims. (Cl. 23—200)

This application is a continuation-in-part of co-pending application Serial No. 127,873, filed July 31, 1961, and now abandoned.

The present invention is concerned with the production of gamma-ferric oxide.

The gamma-ferric oxide of the present invention is a magnetic material of definite particle size with a particularly high saturation remanence and a very slow print-through factor. Because of these characteristics gamma-ferric oxide of this invention is particularly suitable for the production of magnetic recording media such as tapes having a surface layer which contains the gamma-ferric oxide for the storage of records of sounds, pictures and impulses.

The needle-shaped gamma-ferric oxide of the invention differs from previously known ferromagnetic materials by a greater geometric uniformity of its individual particles, whose lengths are between about 0.4 and about 0.6$\mu$, and whose breadths are between about 0.05 and about 0.1$\mu$. Furthermore, the gamma-ferric oxide of the invention is characterized by a very regular crystalline lattice which contains no or only a very small amount of incorporated foreign material and which, therefore, has no disturbed lattice. The substantial geometric uniformity and the ideal state of the lattice of the gamma-ferric oxide of the invention, in particular, are responsible for its exceptionally high saturation remanence and its unusual copying suppression characteristic or print-through factor. Thus, the saturation remanence amounts to at least 460 gauss $g.^{-1}.cm.^3$.

The copying suppression characteristic or print-through factor of the iron oxides of the invention is based upon a determination that is made on a magnetic recording tape produced therefrom since there are no other known methods which permit an exact determination of this property. The measurement is carried out as described in Normblatt DIN 45, 519, a standard specification issued October 1955 by the Deutschen Normenausschusses, Berlin W 15, published by the Benth-Verlag G.m.b.H., Berlin W 15, Germany.

The copying suppression characteristic of the gamma-ferric oxides of the invention amounts to more than about 60 decibels, which is achieved in this degree by none of the previously known gamma-ferric oxides.

Since high saturation remanence, sensitivity and modulation control decisively improve a magnetic recording medium and a good copying suppression is always sought, these properties of the gamma-ferric oxide of the present invention are of decisive significance for its suitability as a magnetogram carrier or magnetic recording medium.

The fine state of division of the gamma-ferric oxide of the invention promotes the production therefrom of stratified magnetic tapes having a surface layer containing the magnetic particles which are characterized by an exceptionally high volume space factor (volume increment of the magnetic iron oxide of the magnetizable layer;

$$\text{space factor} = 100 \times \frac{\text{volume of the } Fe_2O_3}{\text{volume of the layer}})$$

and by a particularly smooth and unbroken surface. The high volume space factor, which can amount to about 40 and more, leads to a large magnetic flux in the magnetizable layer and thus to a large modulation control in the case of small harmonic distortion factors.

The high surface smoothness of the layer gives a good frequency effect, particularly in the case of low band velocity and promotes a high modulation control of the high frequencies (small wave lengths).

The gamma-ferric oxide of the present invention is obtained by heating ferric oxide hydrate which had been produced in a particular but known manner in a reducing atmosphere and subsequently reoxidizing the material at elevated temperatures. The production of the ferric oxide hydrate takes place by the known process of oxidizing metallic iron at elevated temperatures in the presence of an aqueous ferrous salt solution in which ferric oxide hydrate nuclei are suspended. Nevertheless, the process according to this invention differs, in the first place, from this known process in that for the oxidation of the metallic iron, a nuclei suspension is employed which is produced by the quickest possible oxidation of a ferrous hydroxide precipitate by means of atmospheric oxygen. The ferric oxide hydrate formed by the oxidation of the ferrous hydroxide is obtained in a very finely-divided and geometrically very regular form.

The new process can be described by the following steps: a process for the production of ferromagnetic, needle-shaped crystals of gamma-ferric oxide, substantially all particles of which have a size within the range between about 0.4 and about 0.6$\mu$ in length and between about 0.05 and about 0.1$\mu$ in breadth, which comprises (a) Preparing an aqueous suspension of nuclei of precipitated alpha-FeOOH—Goethite—by the addition of 0.3 to 0.5 equivalents of an aqueous solution of sodium hydroxide to an aqueous solution of ferrous sulfate, oxidizing the thus precipitated ferrous hydroxide by passing through the resulting aqueous suspension of ferrous hydroxide for a period of 15 minutes to 10 hours a rapid current of an oxygen-containing gas of the group consisting of oxygen, air and mixtures of oxygen and air, whereby said aqueous suspension still contains a substantial proportion of dissolved ferrosulfate, having a pH of between about 3 to about 4.5;

(b) Adjusting the concentration of said aqueous suspension of precipitated alpha-FeOOH-nuclei containing dissolved ferrous sulfate to a concentration between about 5 and about 10 grams of ferric oxide hydrate per liter;

(c) Adding metallic iron to the said aqueous suspension;

(d) Passing a stream of one of the said oxygen-containing gases through the said aqueous suspension containing metallic iron at a rate such that the increase in concentration of the alpha-FeOOH-nuclei in the suspension is 0.3 to 1 gram per liter per hour and for such a period that the increase in concentration of alpha-FeOOH-nuclei produced in the said suspension remains 4.8 to 6 times their initial concentration;

(e) Separating, washing and drying the alpha-FeOOH thus produced;

(f) Reducing the said dried alpha-FeOOH with hydrogen to black alpha-$Fe_3O_4$ at a temperature between about 400 and about 440° C. until it contains an amount of ferrous iron equivalent to about 23 to about 25% by weight, and (g) Subsequently reoxidizing the said black alpha-$Fe_3O_4$ with one of the said oxygen-containing gases at a temperature between about 200 and about 260° C. to pure gamma-$Fe_2O_3$.

The production of the suspension of ferric oxide hydrate nuclei takes place in known manner by the mixing together of an aqueous ferrous salt solution with a basic precipitating agent, preferably sodium hydroxide. Oxygen or air is passed into the resultant ferrous hydroxide suspension at room temperature or at a slightly elevated temperature whereby, by suitable measures, according to the invention, provision is made for the quickest possible conversion into ferric oxide hydrate. This can take place either in that the oxidation is carried out with a very large amount of oxygen or air or in that the oxygen or air is exceptionally finely divided in the reaction mixture, for example, by the use of frits (porous diffusion disks) or high-speed stirrers.

In this manner, it is possiblle so to accelerate the oxidation that the conversion of the ferrous hydroxide into ferric oxide hydrate takes place within a few minutes. The favourable effects which this rapid oxidation has upon the geometry and crystal lattice of the ferric oxide hydrate particles, and thus upon the magnetic properties and the copying suppression characteristic are completely retained if the oxidation of the ferrous hydroxide suspension is completed within at most ten hours, preferably within a period between about fifteen minutes and about six hours.

Since the velocity of formation of the ferric oxide hydrate when using ferrous sulfate is smaller than when ferrous chloride is used, ferrous sulfate is preferred for the production of the gamma-ferric oxide of this invention. The concentration of the ferrous sulfate solution also influences, to a certain extent, the course of the reaction. A solution having a concentration between approximately 3 and 5% of ferrous sulfate has proved to be particularly favourable for the process according to the invention.

As a result of the large number of nuclei in the nuclei suspension produced in this manner, the growth velocity of the nuclei particles is itself very small. Furthermore, it is so controlled by a definite choice of the reaction conditions (low reaction temperature, small amount of air, small amount of iron), that the velocity of formation of the ferric oxide hydrate does not exceed, in any phase of the growth process, 1 gram FeOOH per liter in the case of a ferric oxide hydrate nuclei content of about 5 to 10 grams per liter. The best properties are obtained when the growth velocity amounts to about 0.3 to about 0.6 gram of FeOOH per liter per hour.

Finally, the growth process according to the invention is only continued for such a period of time that the amount of ferric oxide hydrate formed amounts at most to about six times the amount of nuclei introduced. It is preferable to commence with a nuclei content of about five to about ten grams per liter and to continue the growth process for such a period of time that about 25 to 50 grams of FeOOH per liter are formed.

When maintaining these conditions, ferric oxide hydrate crystals having a length of about 0.5 to about 0.6$\mu$ and with a breadth of about 0.07$\mu$ are formed. The crystals are all of substantially the same size, practically none—not more than 10%—being of larger size and only a few being of smaller size. The ferric oxide hydrate crystals thus produced satisfy the requirements for a product suitable for conversion to magnetically homogeneous gamma-ferric oxide crystals.

The final conversion of the ferric oxide hydrate into gamma-ferric oxide by heating in a reducing atmosphere and subsequent reoxidation at elevated temperatures can be carried out within relatively wide temperature limits. The temperature range of 400–440° C. has proved to be particularly favourable for the reductive treatment of the material and for the subsequent oxidation treatment the temperature range of 200–260° C. is preferred. The reductive treatment is carried out until the ferrous iron content of the black ferroso-ferric oxide ($Fe_3O_4$) is about 23 to about 25%.

A very important feature of the new process is the pH of the suspension wherein the alpha-FeOOH-nuclei are produced. If the nuclei formation takes place in a neutral or weakly basic medium at temperatures above approximately 50° C., preferably at 70 to 80° C. as disclosed in U.S. patent specification 2,866,686 alpha-$F_2O_3$ is obtained in the form of amorphous balls or cube-shaped crystals. This product is not magnetic and it cannot be converted into magnetic ferric oxide by any known subsequent treatment.

If the oxidation of the ferrous hydroxide precipitate is preformed in a neutral medium or in a medium having a pH of slightly below 7 and at temperature of below approximately 50° C. with a very rapid current of air as disclosed in U.S. patent specifications 3,015,628, 3,015,627, 2,560,970, 2,560,971 and 3,082,067, the ferrous hydroxide is converted into gamma-FeOOH (Lepidocrocite), the particles of which have the shape of relatively blunt needles. The gamma-FeOOH thus obtained can be converted by dehydration at temperatures up to appxomiately 230° C. into magnetic gamma-$Fe_2O_3$, the particles of which are also blunt needles. The remanence of the tape produced of a gamma-$Fe_2O_3$ of that kind is poor, because of its low or small filling density. Likewise the print-through factor of such a tape is very high.

If the oxidation of the precipitated ferrous hydroxide is performed however in an acid medium in accordance with the new process that is in a suspension that still contains a substantial proportion of dissolved ferrosulfate thus having a pH of between 3.0 to 4.5, the ferrous hydroxide is converted into alpha-FeOOH (Goethite) which crystallizes as pointed needles. The nuclei obtained in this way can then be grown further by adding metallic iron to the acid alpha-FeOOH suspension containing dissolved ferrosulfate and passing oxygen or air therethrough preferably at a higher temperature. The larger particles grown or formed in that way are also alpha-FeOOH having a pointed needle shape. By dehydrating this goethite nonmagnetic alpha-$Fe_2O_3$ is obtained, in contrast to the known processes, also in the form of pointed (anisotropic) needles. Although the alpha-FeOOH obtained in accordance with the new process at this point is not ferromagnetic, it can be converted by reduction into $Fe_3O_4$ and by subsequent reoxidation into gamma-$Fe_2O_3$, which gamma-$F_2O_3$ has espectially good magnetic properties.

Additionally the new process is characterized by several other special features: these are the rapid oxidation of the FeOOH, "for a period of 15 minutes to 10 hours" in the step (a) of producing the original nuclei, the employment of a certain concentration of nuclei "between about 5 to about 10 grams per liter" in step (b), growing the nuclei or crystals while maintaining a comparatively low growing rate ("less than 1 gram per liter per hour") and interruption of the crystal growth before it has reached the specified limiting concentration.

The rapid oxidation of the ferrous hydroxide in step (a) leads to the formation of a large number of fine granular, uniformly shaped, highly reactive nuclei particles, while the conditions observed during the further growth of these nuclei control their uniformity. Even larger crystals obtained in accordance with the process are exceptionally free of lattice faults or disturbance spots, and their magnetic properties, especially their coercivity, reach a maximum.

Because of its fine division, the gamma-ferric oxide of the invention can be efficiently dispersed in solutions of the usual binding agents used for the production of magnetic surface layers of magnetic recording media or tape. The magnetizable layers, strata, or laminae produced therefrom are characterized by an exceptionally high volume space factor and a large surface smoothness. The good magnetic properties of the ferric oxide of the invention, its slight copying effect and the possibility of producing, with these oxides, magnetizable layers having high volume space factors and high surface smoothness, results in magnetic recording media or tape having properties which were hitherto not achievable and which are particularly suitable for use as magnetic picture and impulse recording carriers.

As carrier or support for such magnetic recording layers there may be used, for instance, films, ribbons, tapes, foils, sheets, disks and drums formed of plastics such as cellulose acetate, polyvinyl chloride, polyesters, for instance, poly-ethylene glycol terephthalate and polycarbonates, polyurethanes and so on, and of metals, such as aluminum, aluminum alloys, bronze, electron and so on. As binding agent for the magnetizable layers or strata with which the carriers are coated or to which they are affixed or bound there may be used all of the usual film formers, such as resins which yield physically drying lacquers, for instance, polyvinyl chloride, polyvinyl acetate, copolymers of polyvinyl chloride and acetate, polyvinyl ethers, polyacrylic and methacrylic acid esters, copolymers of acrylonitrile and butadiene, cellulose esters, such as cellulose acetate and nitrate, cellulose ethers, polycarbonates and so on; furthermore chemically hardening resins, such as polyurethanes produced from polyhydroxy compounds, especially polyesters with free hydroxyl groups, and di- and polyisocyanates, as well as epoxy resins in combination with amines, polyamines, polyamides or polyisocyanates, and other polyaddition and polymerization lacquers.

The following examples are given for the purpose of illustrating the present invention:

*Example 1*

1600 grams of ferrous sulfate heptahydrate are dissolved in 12 liters of water and mixed at 20° C., with stirring, with 340 cubic centimeters of 16.8 N sodium hydroxide solution. 10–15 liters of air per minute are passed into the resultant ferrous hydroxide suspension at 20° C. with the use of a high-speed stirrer. The oxidation of the ferrous hydroxide to alpha-FeOOH (Goethite) is completed in about 45 minutes.

The nuclei suspension having a pH of 3 to 3.5 is mixed with a solution of 1600 grams of ferrous sulfate heptahydrate in about 10 liters of water and the mixture made up to a volume of 40 liters with water. The alpha-FeOOH-nuclei content now amounts to about 6.35 grams per liter. The FeOOH-containing ferrous salt solution is placed into a reaction vessel provided with heating and stirring means which vessel contains about 4 kilograms of iron wire. 8–10 liters of air per minute are introduced into the reaction mixture at 60° C.

After a reaction period of 84 hours, the alpha-FeOOH content amounts to 36.2 grams per liter, corresponding to a formation velocity of 0.47 gram of alpha-FeOOH per liter per hour.

The iron oxide hydrate is washed free of electrolytes and is dried at 130° C. It consists of needle-shaped crystals whose length is 0.4–0.5$\mu$ and whose breadth is about 0.07$\mu$.

300 grams of the alpha-FeOOH are treated in a closed reaction vessel provided with a stirrer, at 440° C. with hydrogen until the ferrous content of the black oxide (ferroso-ferric oxide, $Fe_3O_4$) amounts to 23.8%. After cooling to about 250° C. atmospheric oxygen is passed over the powder until no more ferrous iron is detectable. The resulting gamma-ferric oxide has a saturation remanence $B_R\rho$ of 483 gauss g.$^{-1}$.cm.$^3$ and has a coercivity $I_{HC}$ of 315 oerstedt.

200 grams of this gamma-ferric oxide are ground into a solution of 40 grams of a polyester made from 3 mols of adipic acid, 2 mols of 1.3-butylene glycol and 2 mols of hexanetriol in 420 cubic centimeters of a mixture of ethyl acetate and chlorobenzene (1:1) in a grinding mill for 24 hours. 29 grams of a triisocyanate obtained by the reaction of 3 mols of tolylene diisocyanate with a polyalcohol and, if desired, further solvents are added and the resulting iron oxide-lacquer suspension is applied as a film to a cellulose acetate film having a thickness of 40 microns in a layer having a thickness such that its iron oxide content is equivalent 23 grams/m.$^2$. The thickness of the dried magnetizable layer is 12.4$\mu$. This corresponds to a volume space factor of about 40%. For the calculation of the volume space factor, a film thickness equivalent to a gamma-ferric oxide content of 4.7 grams/cm.$^3$ is used as a basis. A measurement of the copying suppression in accordance with the method described in the German Normblatt DIN 45, 519 gives a result of 62.3 decibels.

*Example 2*

5250 kilograms of anhydrous ferrous sulfate are dissolved in 2.5 cubic meters of water and mixed at 23° C. with a solution of 815 kilograms of sodium hydroxide in 4.35 cubic meters of water. Air in an amount increasing continuously from 150 to 2000 cubic meters is passed, with stirring, into the ferrous hydroxide suspension, having a pH of 4 to 4.5, during a period of 5½ hours. After this time, the oxidation of the ferrous hydroxide precipitate to alpha-FeOOH hydrate is completed. After the addition of an additional 1100 kilograms of anhydrous ferrous sulfate, the nuclei suspension is made up to a volume of 74 cubic meters.

18.5 cubic meters of this alpha-FeOOH-containing ferrous sulfate solution are placed in a 50 cubic meters reaction vessel containing 1500 kilograms of sheet iron scrap and made up to a volume of 34.3 cubic meters with water. The alpha-FeOOH-content now amounts to 7.4 grams per liter; the concentration of the ferrous sulfate solution is 3.12%.

The reaction mixture is heated to 65° C. and 75 cubic meters of air per hour are introduced, with stirring. After 75 hours, 35.9 grams of ferric oxide hydrate per liter have been formed, corresponding to a formation velocity of 0.38 gram of alpha-FeOOH per liter per hour. The ferric oxide hydrate is washed free of electrolytes and dried at about 130° C. The length of the needle-shaped crystals is about 0.5$\mu$, with a particle breadth of 0.07 to 0.08$\mu$.

60 kilograms of this alpha-FeOOH are dehydrated by heating for 12 hours at about 300° C. and introduced into a closed reaction vessel. The material is treated at 410° C., with stirring, with a hydrogen-nitrogen mixture (1:1) until the ferrous iron content of the $Fe_3O_4$ amounts to 23.9%. After cooling to about 250° C., atmospheric oxygen was passed over the material until a homogeneous brown coloration has been achieved and divalent iron is no longer detectable.

The gamma-ferric oxide thus obtained has a saturation remanence $B_R\rho$ of 482 gauss g.$^{-1}$.cm.$^3$ and a coercivity $I_{HC}$ of 343 oerstedt.

Twelve kilograms of this gamma-ferric oxide and 600 grams of after-chlorinated polyvinyl chloride, 900 grams of polyvinyl isobutyl ether. 1500 grams of a mixed polymer of polyvinyl chloride and polyvinyl acetate and 550 grams of benzyl butyl phthalate dissolved in 12.75 liters of ethyl acetate, 10 liters of butyl acetate and 2.5 liters of cyclohexanone are ground for 30 hours in a ball mill.

The iron oxide-lacquer suspension thus obtained is applied as a film to a polyester foil having a thickness of 40 microns so that the thickness of the iron oxide-containing layer is equivalent to an iron oxide content of 20 grams/m.$^2$. The dried, magnetizable layer has a thickness of 10.6 microns. This corresponds to a volume space factor of about 40.

The copying suppression of the magnetic band, measured in accordance with the method described in the German Normblatt DIN 45, 519 is 63.0 decibels.

We claim:

1. A process for the production of ferromagnetic, needle-shaped crystals of gamma-ferric oxide, substantially all particles of which have a size within the range between about 0.4 and about 0.6 micron in length and between about 0.05 and about 0.1 micron in breadth, which comprises (a) preparing an aqueous suspension of nuclei of precipitated alpha-FeOOH (Goethite) by the addition of 0.3–0.5 equivalents of an aqueous solution of sodium hydroxide to an aqueous solution of ferrous sulfate, oxidizing the thus precipitated ferrous hydroxide by passing through the resulting aqueous suspension of ferrous hydroxide for a period of 15 minutes to 10 hours a rapid current of an oxygen-containing gas of the group consisting of oxygen, air, and mixtures of oxygen and air, whereby said aqueous suspension still contains a substantial proportion of dissolved ferrosulfate, having a pH of between about 3 to about 4.5;

(b) adjusting the concentration of the said aqueous suspension of precipitated alpha-FeOOH-nuclei containing dissolved ferrous sulfate to a concentration between about 5 and about 10 grams of ferric oxide hydrate per liter;

(c) adding metallic iron to the said aqueous suspension;

(d) passing a stream of one of the said oxygen-containing gases through the said aqueous suspension containing metallic iron at a rate such that the increase in concentration of the alpha-FeOOH-nuclei in the suspension is 0.3 to 1 gram per liter per hour and for such a period that the increase in concentration of alpha-FeOOH-nuclei produced in the said suspension remains 4.8 to 6 times their initial concentration;

(e) separating, washing, and drying the alpha-FeOOH thus produced;

(f) reducing the said dried alpha-FeOOH with hydrogen to black alpha-$Fe_3O_4$ at a temperature between about 400 and about 440° C. until it contains an amount of ferrous iron equivalent to about 23 to about 25% by weight, and (g) subsequently reoxidizing the said black $Fe_3O_4$ with one of the said oxygen-containing gases at a temperature between about 200 and about 260° C. to pure gamma-$Fe_2O_3$.

2. A process as defined in claim 1, in which the oxidation specified in step (a) is completed within a period between 15 minutes and 6 hours.

3. A process as defined in claim 1, in which the oxidation specified in step (d) is conducted at such a rate that between about 0.3 and about 0.6 gram of ferric oxide hydrate nuclei are formed per liter per hour.

4. Gamma-ferric oxide in the form of discrete particles of needle-shaped crystals substantially all particles of which have a size within the range between about 0.4 and about 0.6 micron in length and between about 0.05 and about 0.1 micron in breadth, having a saturation remanece of more than 460 gausses $g.^{-1}.cm.^3$ and a print-through factor of more than 60 decibels as determined on a magnetic tape produced therefrom, said gama-ferric oxide being produced according to claim 1.

References Cited by the Examiner

UNITED STATES PATENTS

| | | | |
|---|---|---|---|
| 2,694,656 | 11/1954 | Camras | 252—62.5 X |
| 3,015,627 | 1/1962 | Ayers et al. | 23—200 X |
| 3,015,628 | 1/1962 | Ayers et al. | 23—200 X |
| 3,075,919 | 1/1963 | Gruber et al. | 23—200 X |
| 3,082,067 | 3/1963 | Hund | 23—200 |

BENJAMIN HEKIN, *Primary Examiner.*
MAURICE A. BRINDISI, *Examiner.*